United States Patent [19]
DeTroye et al.

[11] Patent Number: 5,401,978
[45] Date of Patent: Mar. 28, 1995

[54] LASER-OPTIC MISSILE CONTROL SURFACE MONITOR

[75] Inventors: David J. DeTroye; Thomas J. Bock, both of Woodbridge; Vincent J. Ellis, Stafford, all of Va.

[73] Assignee: The United states of America as represented by the Secretary of the Army, Washington, D.C.

[21] Appl. No.: 81,892

[22] Filed: Jun. 24, 1993

[51] Int. Cl.⁶ ............................................. G01D 5/34
[52] U.S. Cl. ................................ 250/561; 250/237 G
[58] Field of Search .................. 250/216, 561, 237 G, 250/214. PR; 356/400, 401

[56] References Cited

U.S. PATENT DOCUMENTS

| | | |
|---|---|---|
| 4,744,663 | 5/1988 | Hamashima et al. . |
| 4,902,135 | 2/1990 | Takiguchi . |
| 4,911,307 | 3/1990 | Jennings . |
| 4,928,008 | 5/1990 | Huggins et al. ................ 250/237 G |
| 4,928,091 | 5/1990 | Masuzawa . |
| 4,971,443 | 11/1990 | Koyagi . |
| 5,246,000 | 9/1993 | Ellis et al. ............................. 607/26 |

OTHER PUBLICATIONS

Patent Application Filed Apr. 27, 1992 Serial No.: 07/874 320 Docket No.: HDL 91-15 Application: Ellis et al.

*Primary Examiner*—David C. Nelms
*Assistant Examiner*—John R. Lee
*Attorney, Agent, or Firm*—Freda L. Krosnick; Frank J. Dynda

[57] ABSTRACT

A system uses laser optic technology for non-obtrusive monitoring of movements a missile control surface undergoing electromagnetic testing. The system includes a laser source, a detector positioned opposite the laser source, an attenuator assembly positioned between the laser source and the detector, and a recorder for recording data processed by the detector. The attenuator assembly consists of a framed translucent gray scale shaded window mounted on a block member, which in turn is mounted to the missile control surface. The control surface is a pivotally mounted canard member on the missile body. Generated laser beams project onto the gray scale shaded window. The gray scale shading affects the intensity of the directed laser beams (darker areas attenuate more light and lighter areas allow more light to pass through). Accordingly, data is obtained from tracking the different shades of the light intensities which are directly related in synchronization with the movements of the canard member of the monitor assembly. The resulting intensity data is detected and measured by the detector and then processed by the recorder. Thus, as the control surface moves, the recorded data provides a basis for determining recognition characteristics with respect to the missile control surface, such as (1) the direction of the movement, (2) the distance of the movement, and (3) the speed of the movement.

9 Claims, 7 Drawing Sheets

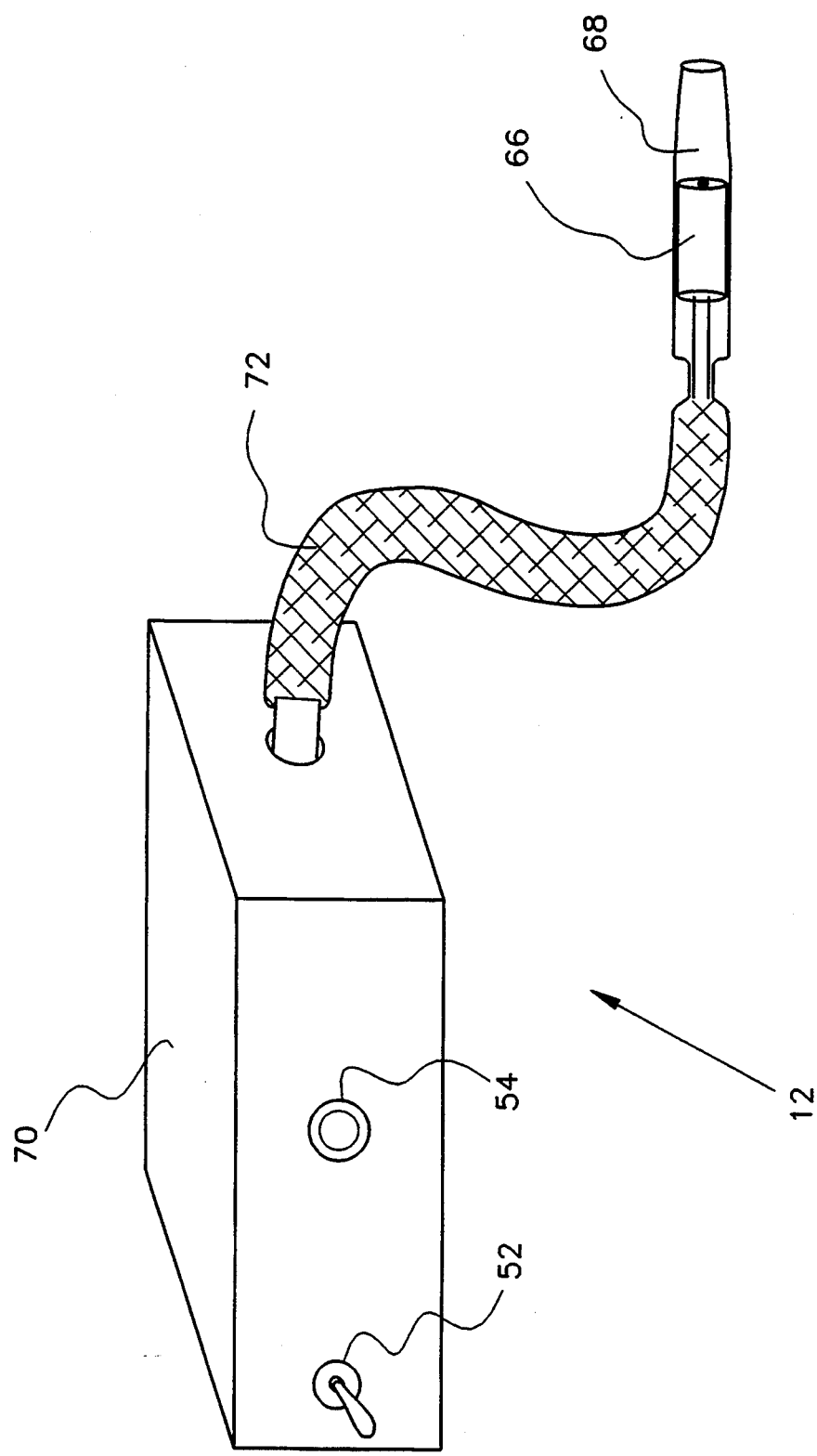

LASER-OPTIC MISSILE CONTROL SURFACE MONITOR

GOVERNMENT INTEREST

The invention described herein may be manufactured, used, and licensed by or for the U.S. Government without payment to us of any royalty thereon.

BACKGROUND OF THE INVENTION

1. Field of the Invention

The present invention relates to a system using laser optic technology for non-obtrusive monitoring which provides data derived from movements of a missile control surface while undergoing electromagnetic testing. The system provides a novel means of using laser light intensities on a translucent gray scale window for remotely monitoring these movements in synchronization.

2. Description of Prior Art

Various techniques have been reported in the prior art for monitoring movements and the like with respect to an object.

Lasers have been widely used in the past for such matters as determination of speed and distance, and movement of an object. However, a laser has not been used in the manner disclosed herein to monitor the movement of an object undergoing electromagnetic testing. Reference is made to pending patent application Ser. No. 07/874 320 filed Apr. 27, 1992, now U.S. Pat. No. 5,246,000, which relates to testing of a cardiac pacemaker in an electromagnetic field. This application is incorporated by reference herein. One of the Applicants of the instant application is also a co-applicant of the referenced application.

In practice, visual observation and the use of a camera have been used to monitor a missile control surface while undergoing testing. Another technique involves the use of intercepting the missile's normal control signals transmitted internally, which indicate the movements of the control surface during testing.

The visual monitor technique is obviously an inferior method in that only movements that are visible to the naked eye or the camera can be observed. It is possible that movements not visually observable by the eye or camera may be important for a test. Additionally the visual or camera observations are only a qualitative measurement of the movement on the monitored surface; that is, did it move or didn't it move. Further, this type of data record does not indicate the distance or speed of movement. A disadvantage of monitoring internal signals derived from the missile control surface under test is that some obtrusive means (probe) may be required to retrieve the signals from the system involved. Any method used to pick-off the internal signals can potentially corrupt the integrity of the system and consequently, the derived data.

SPECIFIC PRIOR ART

U.S. Pat. No. 4,744,663 to Hamashima, issued May 17, 1988, discloses a pattern position detection apparatus using a laser beam for recognizing features of a semiconductor circuit pattern.

U.S. Pat. No. 4,902,135 to Takiguchi, issued Feb. 20, 1990, discloses an object movement measuring apparatus in which a movement monitor detects the movement of an object under measurement to output a signal in synchronization with the movement, and the signal thus outputted is utilized to trigger a streak camera.

U.S. Pat. No. 4,911,307 to Jennings, issued Mar. 27, 1990, discloses a machine for sizing an object that is in motion. The machine includes an optical means for providing a collimated light beam in the path of the object, a sensing means for monitoring the variations in light flux occurring in the beam, and an object detecting means for converting the electrical output derived from the light intensity obtained from the sensing means, provides both a reference voltage related to the maximum light intensity, and a sense voltage which is related to the size of the object. The reference voltage and the sense voltage are then compared to obtain a size evaluation of the object.

U.S. Pat. No. 4,971,443 to Koyagi, issued Nov. 20, 1990, discloses an optical position detecting method and an apparatus for projecting incident optical beams on a measured surface of an object having two types of reflecting regions which are different in reflectance from each other, and of receiving reflected optical beams reflected by the reflection regions on a photoelectric conversion element of at least a one dimensional arrangement, to thereby detect the projected position of the optical beams on the basis of a light signal received from the photoelectric conversion element.

SUMMARY OF THE INVENTION

The system of the present invention uses laser optic technology for non-obtrusive monitoring which provides data derived from various aspects of movements of a missile control surface of a missile which is undergoing electromagnetic testing. The system comprises a laser source, an optical detector means positioned opposite the laser source, an attenuator assembly including a framed translucent gray scale shaded window means positioned between the laser source and the detector means, and means for recording output signals derived from the detector means. The attenuator assembly provides for the window means being mounted on an electromagnetically transparent member, which in turn is mounted on the missile control surface. Thereby the attentuator assembly moves in concert with the missile control surface and at the same time does not affect the electromagnetic signature of the missile. Generated laser beams project on the gray scale shaded window means. The gray scale shading affects the intensity of the directed laser beams (the darker areas attenuate more light and the lighter areas allow more light to pass through). Accordingly, data is obtained by optical detecting of the different light intensities passing through the attenuator window means, which are directly related in synchronization with the movements of the attenuator assembly, and therefore the missile control surface. The resulting intensity data is detected and output via the optical detector means and then processed by the recorder means. Thus, as the control surface moves, by whatever means, the recorded data provides a basis for determining recognition characteristics for the missile control surface, such as (1) the direction of the movement, (2) the distance of the movement, and (3) the speed of the movement.

Accordingly, it is an object of the present invention to provide a laser-based apparatus for non-obtrusive monitoring of a missile control surface.

It is another object of the invention to provide a method using laser-based apparatus for non-obtrusive monitoring of a missile control surface.

It is still another object of the invention to provide an apparatus and a method for monitoring a control surface of a missile body undergoing electromagnetic testing.

It is still another object of the invention to provide an apparatus and a method for quantitatively evaluating the performance of a missile control surface exposed to an electromagnetic field.

Other objectives of the present invention will be apparent from the following detailed description of the invention.

BRIEF DESCRIPTION OF THE DRAWINGS

The foregoing and other objects, aspects, uses, and advantages of the present invention will be more fully appreciated as the same becomes better understood when considered in connection with the following accompanying drawings, in which:

FIG. 7 is a perspective view representative of a laser assembly.

DETAILED DESCRIPTION OF THE INVENTION

Figure 1:
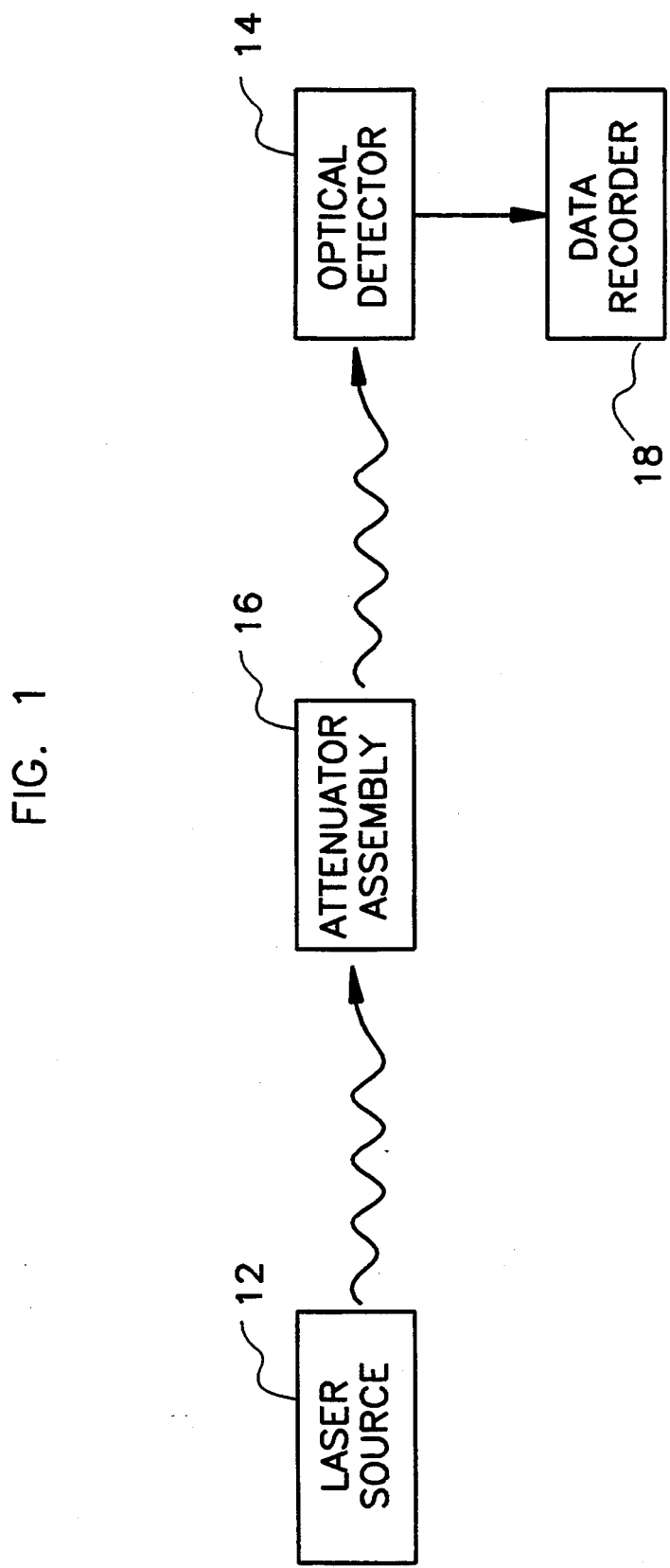
FIG. 1 is a block diagram of a missile control surface monitoring system in accordance with the present invention.

Referring now to the drawings, like reference numerals represent identical or corresponding parts throughout the several views.

FIG. 1 discloses a block component diagram for a system 10 using laser optic technology for non-obtrusive monitoring which provides data derived from movements of a control surface of a missile which is undergoing electromagnetic testing. A source of electromagnetic radiation (not shown) is used to create an electromagnetic field which is made to progagate toward, and interact with the missile. Specifically, the system 10 comprises a laser source 12, an optical detector 14 positioned opposite the laser source 12, an attenuator assembly 16 positioned between the laser source 12 and the optical detector 14. As the control surface of the missile moves by whatever means, the attenuator assembly 16 moves in concert with the control surface and provides attenuation of the incident laser light. The optical detector 14 detects and measures the intensity of the attenuated laser light. The system 10 includes a data recorder 18 which records output data transmitted from the optical detector 14. The system 10 is described herein as having single components such as a laser, and attenuator assembly, and a detector, but it is obvious that multiple units of such components may be used in practicing the invention. Further, the attenuator assembly is made of no metallic parts as to not effect the electromagnetic signature of the missile under test. Furthermore, the laser and detector components are enclosed in metal boxes effectively shielding them from external electromagnetic fields which could enter and corrupt the data during electromagnetic testing.

SINGLE CHANNEL EMBODIMENT

Figure 2:
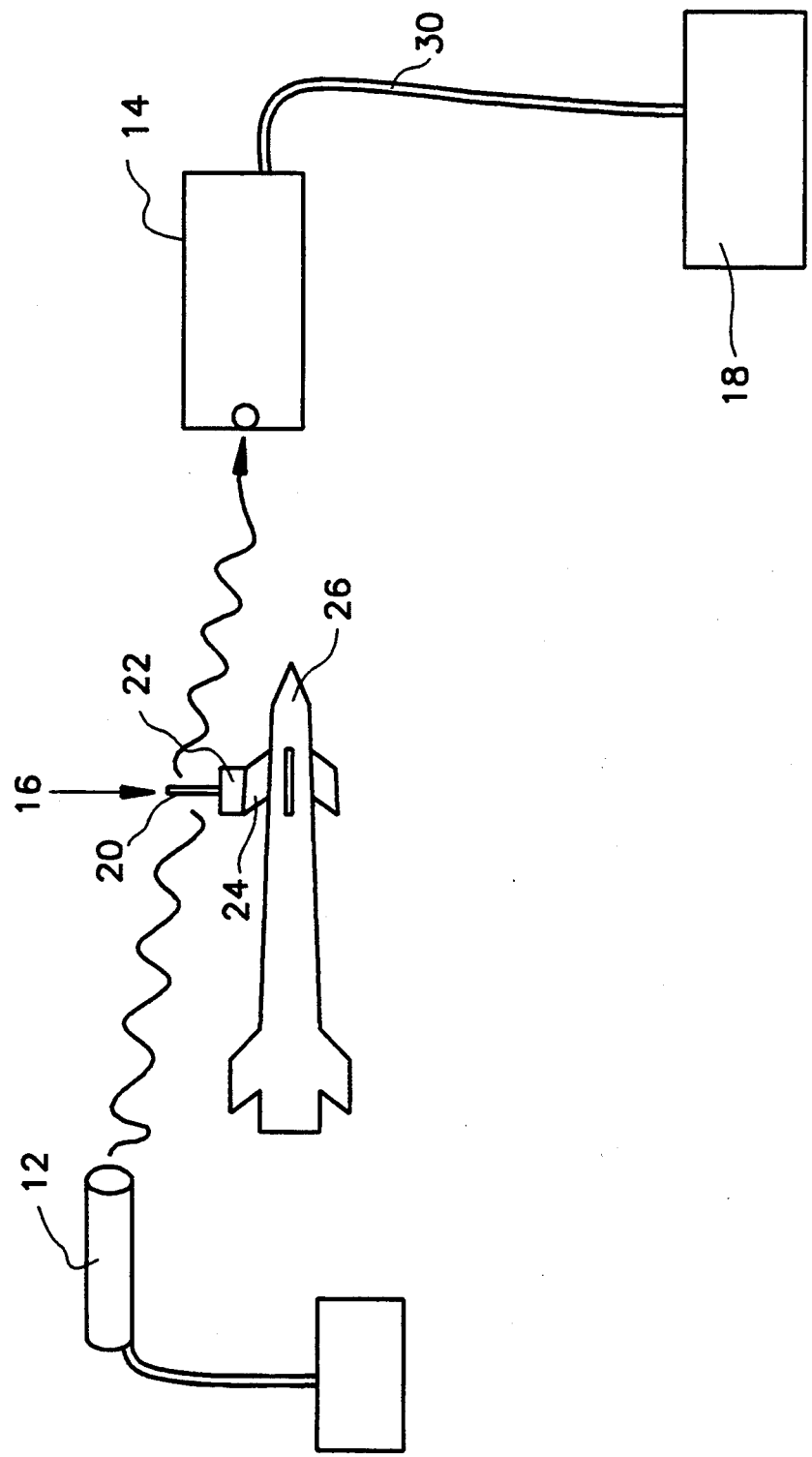
FIG. 2 is a perspective view of a system involving a single channel arrangement.
Figure 3:
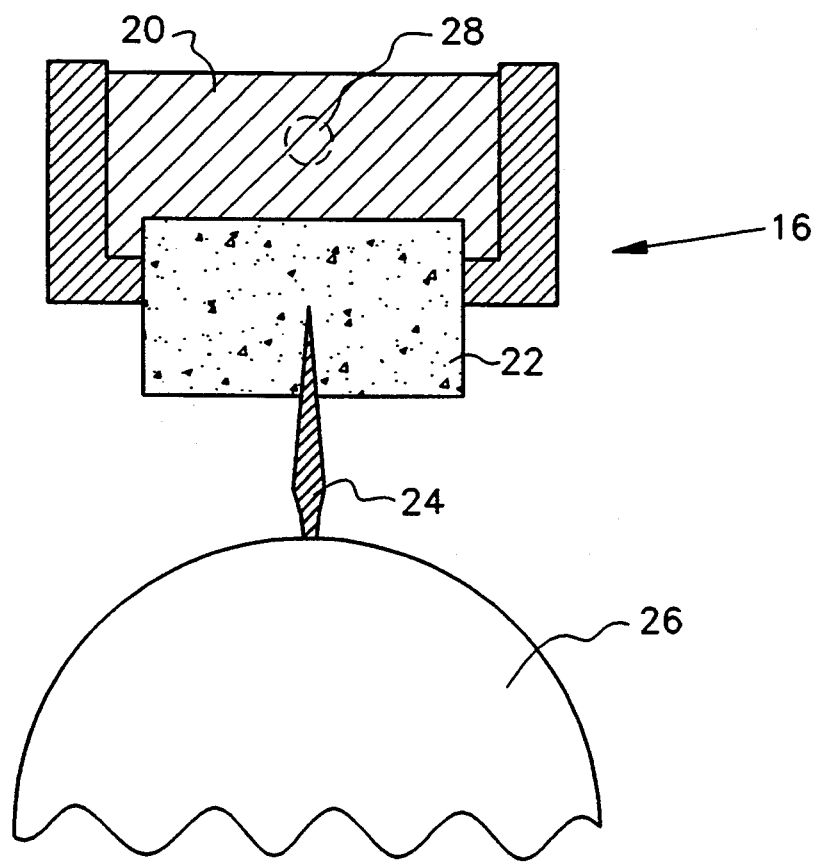
FIG. 3 is cross sectional view of the system's attenuator assembly comprising a shaded cellophane window, an block support, a canard fin, and a missile body.

FIG. 2 discloses a single channel arrangement of the system 10 which comprises the laser means 12, the optical detector means 14, the attenuator assembly 16, and the data recorder 18. In FIG. 3, the attenuator assembly 16 consists of a window means 20 mounted on a non-conductive block member 22, which in turn is mounted on a missile control surface such as a canard fin 24. The canard fin 24 is pivotally mounted on a missile body 26. The window means 20 is composed of a transparent material such as cellophane and is coated with a linear gray scale shading from light to dark from the left side to the right side. The window means 20 is held in a frame made of an electromagnetically transparent material appropriate for the frequencies of concern. The window means 20 is attached to the block member 22 by an appropriate adhesive means. The light beams of the laser source 12 are aimed at the center of the window means 20. The generated laser beam projects on the gray scale shaded window means 20 as shown by a centrally located laser spot 28 (FIG. 3). The gray scale shading affects the intensity of the directed laser beams (the darker areas attenuate more light and the lighter areas allow more light to pass through). Accordingly, data is obtained from tracking the different shades of light intensities which pass through the window means 20 and then to the detector means 14. This data is directly related to the movements of the canard member 24 of the attenuator assembly 16. As the canard moves the attenuator window moves in concert such that the incidental laser beam, will fall on different areas of the shaded window, hence affecting the attenuation of laser light incidental on the photodetector 14. The resulting intensity data is detected and measured by the detector means 14 and then processed by the recorder 18. The detector means 14 is preferably a battery operated photodetector. The detector means 14, being directly opposite the laser means 12, receive the laser beams after their passage through the window means 20. The electrical output from the detector means 14 is filtered to remove any noise due to optics, system vibration, etc. In a situation where movement only is the desired observable and is not in an absolute stationary position, the filtered detector means 14 may be passed through a DC block. The conditioned output from the detector means 14 is then fed, as shown i FIG. 2, via a shielded cable 30 to the remotely located recorder 18 which is preferably a data acquisition/archival type instrument. In a situation, where the missile control surface is stationary, the data will show a DC level. In a situation where the control surface (canard member 24) moves in one direction, the laser beam appears on the resulting light gray scale on the window means 20, then the light signal will increase; if the movement is in the opposite direction (darker shading), the light signal will decrease. Thus, as the control surface moves, the recorded data provides a basis for determining recognition characteristics for the missile control surface, such as (1) the direction of the movement, (2) the distance of the movement, and (3) the speed of the movement. These characteristics quantify the effects of electromagnetic testing on the normal operation of the missile control surfaces.

FOUR CHANNEL EMBODIMENT

Figure 4:
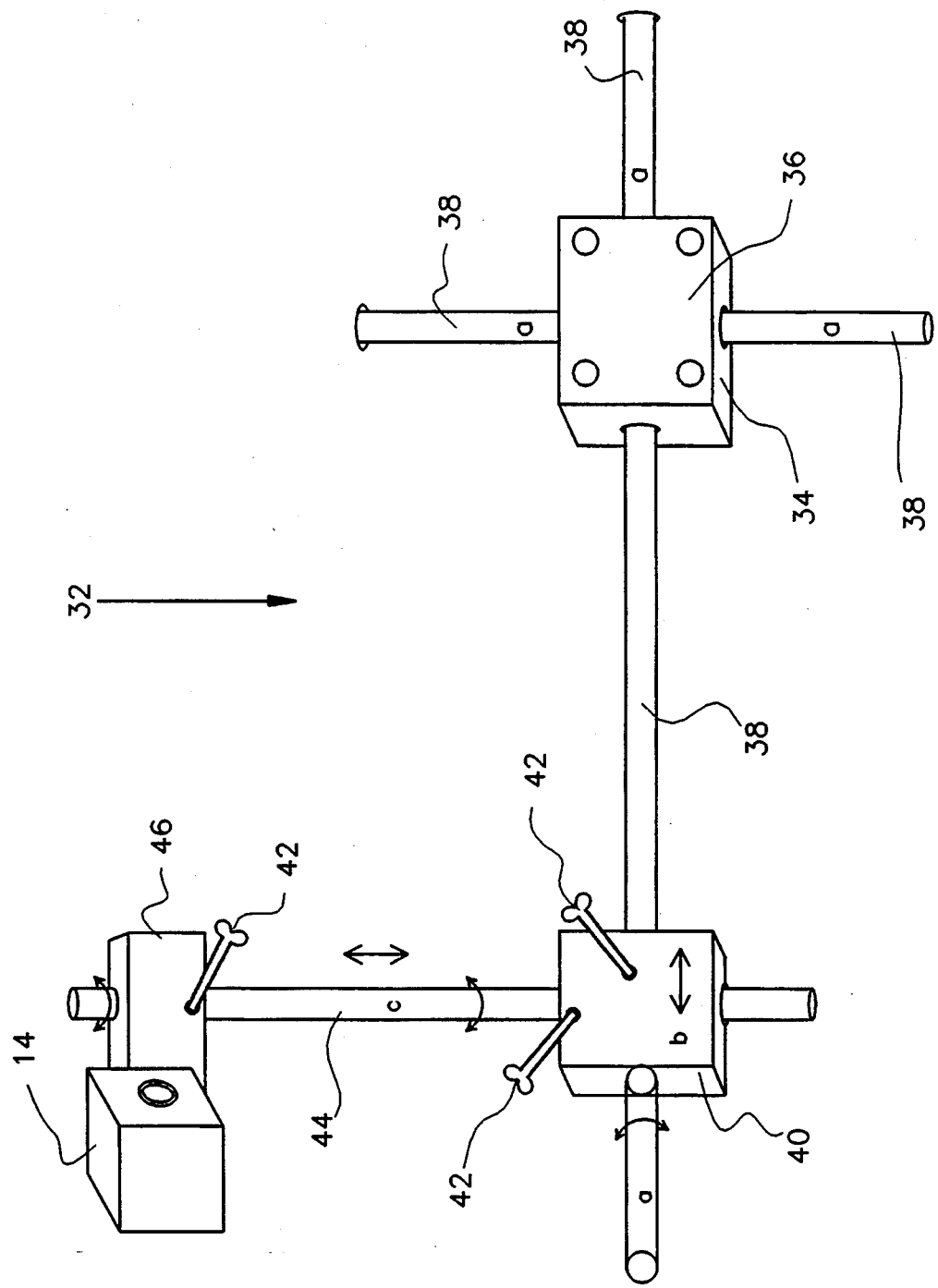
FIG. 4 is a perspective view of a system involving a four channel adjustable support arrangement for lasers or detectors.

FIG. 4 illustrates a single unit of a four channel adjustable support device 32 for mounting a plurality of lasers and optical detectors. Four units of the support device 32 accommodate four laser or detector units of the system 10 thereby providing a four channel structural arrangement that could be used to monitor four canards on a missile body simultaneously yet be operationally performed for each canard separately. Thus, the support device 32, and it's stand, provides three-dimensional use of four laser/detector units simultaneously. For example, and individual laser may be adjusted so that a projected laser beam will definitely strike the face of the optical detector that is remotely located directly opposite the laser.

A single unit of the support device 32 is described hereinbelow and it is to be understood that all four units have similar structure and function. A single unit of the support device 32 includes a rectangular block structure 34 which is provided with a mounting plate 36. The block 34 is attached to a rigid pole or some similar support (not shown). Four primary guide rods 38 are located 90 degrees apart and extend radially out therefrom and are attached through holes in the box 34. As shown in FIG. 4, the rod 38 which protudes from the left side of box 34 extends through a pass-through hole in a primary adjusting block 40. It is to be understood that the other three rods 38 also pass into other primary adjusting blocks (not shown). The primary adjusting block 42 is held firmly in place on the rod 38 by an appropriately positioned thumbscrew 42. A secondary guide rod 44 passes through another hole in the block 42. The secondary guide rod 44 is positioned 90 degrees with respect to main guide rod 38 in primary adjusting block 40. The secondary guide rod 44 is also held firmly in the block 40 by a thumbscrew 42. The secondary guide rod extends upwardly as shown in FIG. 4 through a hole in a laser/detector mounting block 46. The block 46 is held firmly in place by a thumbscrew 42. It is readily understood by the above structural arrangement that by loosening the thumbscrews 42 and manipulating the respective blocks and rods, that the particular laser or detector may be positioned three dimensionally to facilitate alignment thereof.

DETAILED DESCRIPTIONS OF THE PHOTODETECTOR AND LASER

Figure 5:
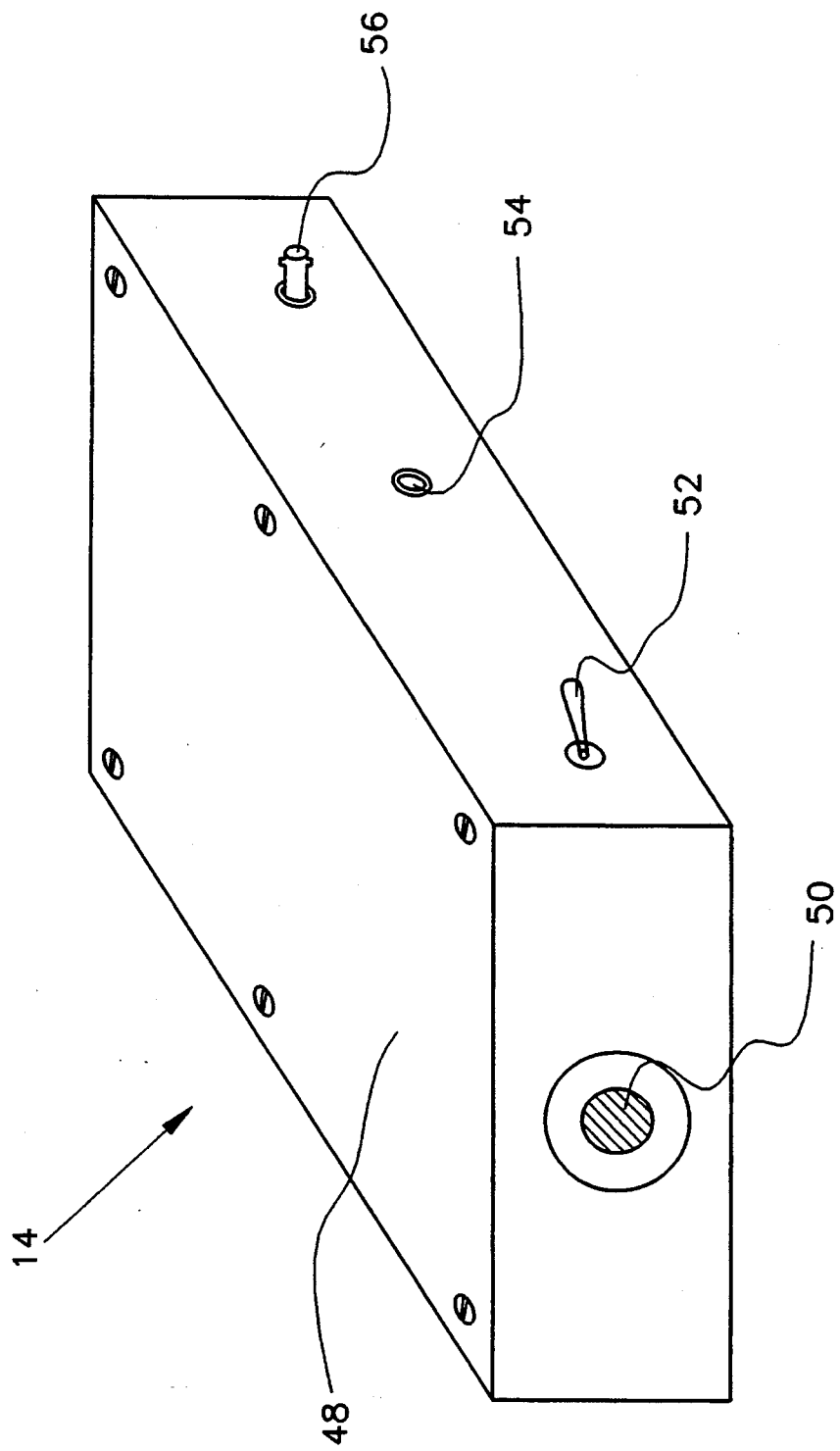
FIG. 5 is a perspective view representative of a photodetector assembly.

FIG. 5 illustrates the optical detector 14 as a battery operated photodetector. The electronics and the power source battery are enclosed in a RF tight box 48. The lens of a phototransistor 50 protrudes through a hole in the front of the box 48. The detector 14 is provided with an of/off switch 52, a charging jack 54, and an output cable connector 56.

Figure 6:
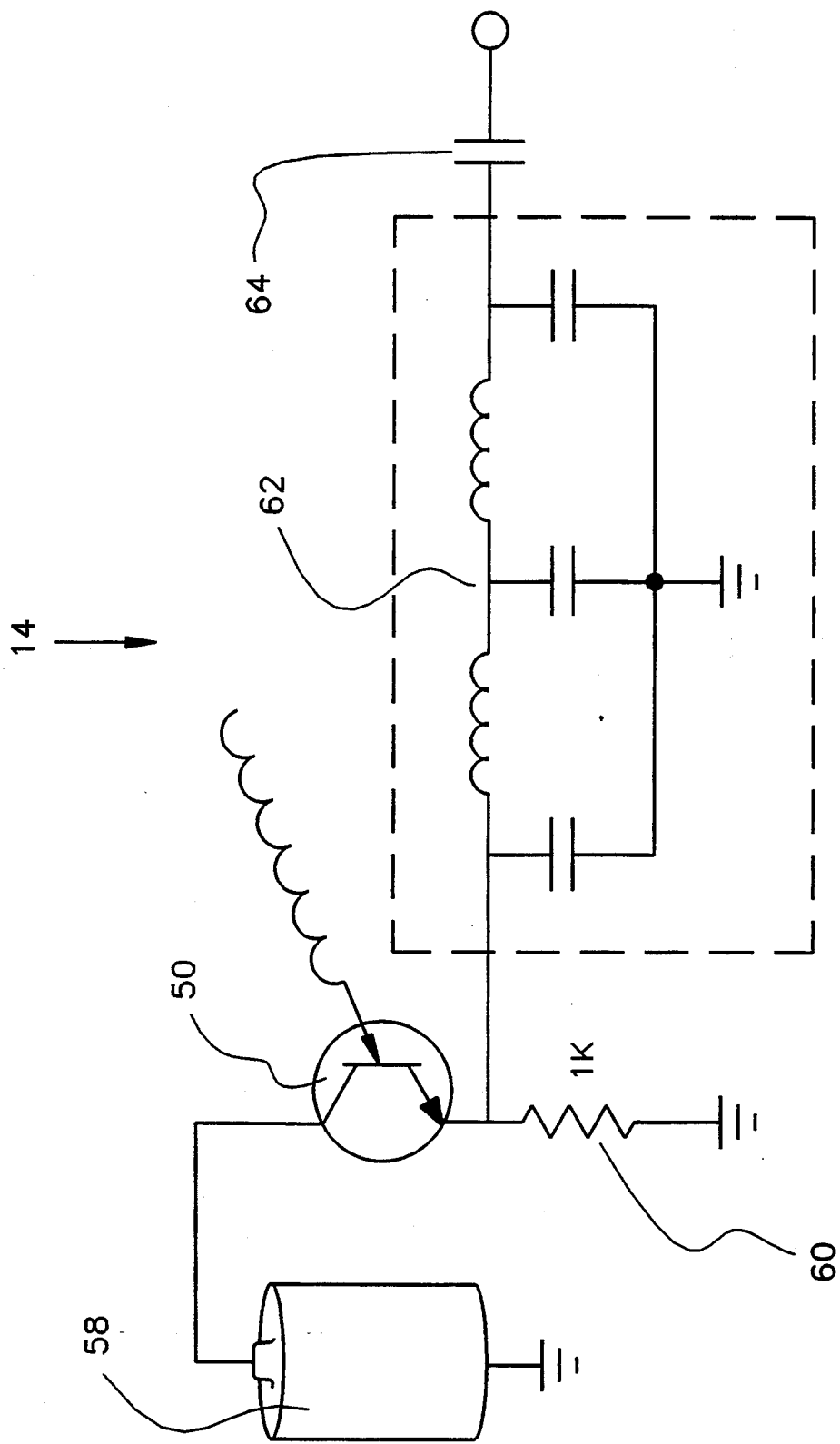
FIG. 6 is a schematic diagram representative of the photodetector assembly.

FIG. 6 illustrates an electrical schematic of the battery operated photodetector 14. A battery 58 supplies power to the collector of phototransistor 50. The output signal is taken at the emitter of the phototransistor, across the load 60, through an optional pi filter 62 and an optional DC block 64.

FIG. 7 illustrates the laser system 10 that consists of a laser unit 66 contained within a (cut-away view) metal cylinder 68 which serves as a waveguide beyond cutoff. The laser power is supplied by batteries within power box 70 and fed via wires shielded by shield braid 72.

Obviously, numerous modifications and variations of the present invention are possible in light of the above disclosure. For example, the teachings of the present system are not only applicable to a missile fin control surface, but is also applicable to remote sensing of any movable surface where linearity and rate of movement is required to be recorded. It is therefore to be understood that the present invention can be practiced otherwise than as specifically described herein and still will be within the spirit and scope of the appended claims.

What is claimed is:

1. An apparatus for quantitatively evaluating the performance of movements of an object comprising in combination:
   - a laser means for generating and directing laser light beams;
   - a detector means operatively positioned opposite the laser means;
   - an attenuator assembly operatively positioned between the laser means and the detector means;
   - the attenuator assembly including a gray scale shaded window means for intercepting and partially attenuating the generated directed laser beams; wherein said attenuator assembly is electromagnetically transparent;
   - the various movements of the object being directly related to the intensity of the laser beam intercepted and attenuated by shaded areas of the gray scale shaded window means and signals being produced by the intercepted shaded areas changing;
   - the signal being detected by the detector means; and means for recording output from the detector means.

2. Apparatus as defined in claim 1 wherein the laser means and detector means are adjustably mounted.

3. Apparatus as defined in claim 1 wherein the window means is made of an electrically transparent material.

4. Apparatus as defined in claim 3 wherein the material is a translucent gray scale material.

5. Apparatus as defined in claim 1 wherein the detector means is a photodetector of the filtered type for removing noise.

6. Apparatus as defined in claim 1 wherein the laser means and detector means are provided with shielded means against electromagnetic influence from without.

7. Apparatus as defined in claim 1 or 6 wherein the laser means and detector means are battery operated.

8. A method of using an apparatus for monitoring movements of a control surface of a missile while the missile is undergoing testing in an electromagnetic area, said apparatus including a laser means for generating and directing spot beams, an optical detector means operatively positioned opposite the laser means, an electromagnetically transparent attenuator means including a window assembly operatively positioned between the laser means and the optical detector means, and a recorder for recording data output produced by the apparatus, comprising the following steps:
   (a) positioning the missile control surface in the electromagnetic area;
   (b) positioning the laser means, the attenuator means, and the optical detector means at substantially a straight line path;
   (c) attaching the attenuator means to the missile control surface;
   (d) locating the laser means at an operative distance from the missile control surface;
   (e) positioning the optical detector means at an operative distance from the missile control surface;

(f) projecting spot beams from the laser source perpendicular to and centered onto the window assembly;

(g) the projected spot beams being detected via the window assembly by the optical detector means;

(h) generating the electromagnetic area with a source; and (i) data derived from the detected spot beams being recorded by the recorder.

9. A method for monitoring the movements of a missile control surface while the missile is undergoing electromagnetic testing, comprising the following steps:

(a) positioning the missile control surface in an area for testing;

(b) positioning a laser source, an electromagnetically transparent attentuator means, and a detector means at substantially straight line path testing area;

(c) attaching the attenuator means to the missile control surface;

(d) locating the laser source at an operative distance from the missile control surface;

(e) positioning the detector means at an operative distance from the missile control surface;

(f) projecting a beam from the laser source perpendicular to and centered to a window assembly of the attenuator means;

(g) the projected beam being detected by the detector means; and (h) data derived from the detected beam being recorded by a recorder.

* * * * *